(12) United States Patent
Price et al.

(10) Patent No.: US 11,761,358 B2
(45) Date of Patent: Sep. 19, 2023

(54) MULTI-PORT EXHAUST VALVE FOR TWO-STROKE ENGINES

(71) Applicant: Arctic Cat Inc., Thief River Falls, MN (US)

(72) Inventors: Carson Price, Minnetonka, MN (US); Jeremy Mammen, Thief River Falls, MN (US)

(73) Assignee: ARCTIC CAT INC., Thief River Falls, MN (US)

( * ) Notice: Subject to any disclaimer, the term of this patent is extended or adjusted under 35 U.S.C. 154(b) by 0 days.

(21) Appl. No.: 17/744,210

(22) Filed: May 13, 2022

(65) Prior Publication Data

US 2023/0258110 A1    Aug. 17, 2023

Related U.S. Application Data

(60) Provisional application No. 63/310,994, filed on Feb. 16, 2022.

(51) Int. Cl.
| | |
|---|---|
| *F01L 7/12* | (2006.01) |
| *F02D 13/02* | (2006.01) |
| *F01L 7/10* | (2006.01) |

(52) U.S. Cl.
CPC ...... *F01L 7/12* (2013.01); *F01L 7/10* (2013.01); *F02D 13/0242* (2013.01); *F02D 2200/101* (2013.01)

(58) Field of Classification Search
CPC .................. F02B 2075/025; F02B 33/44
See application file for complete search history.

(56) References Cited

U.S. PATENT DOCUMENTS

| | | |
|---|---|---|
| 5,331,927 A | 7/1994 | Solomon et al. |
| 5,829,394 A | 11/1998 | Oike et al. |
| 6,415,748 B2 | 7/2002 | Uchida et al. |
| 6,609,367 B2 | 8/2003 | Nakayasu et al. |
| 6,655,134 B2 | 12/2003 | Nakavasu et al. |
| 7,150,336 B2 | 12/2006 | Desmarais |
| 7,213,544 B2 | 5/2007 | Zauner |
| 7,225,792 B2 | 6/2007 | Nakamura et al. |
| 7,367,295 B2 | 5/2008 | Zauner |
| 7,762,220 B2 | 7/2010 | Okanovic et al. |
| 7,802,424 B2 | 9/2010 | Kanzawa et al. |
| 8,997,701 B2 | 4/2015 | Hooper et al. |
| 9,404,399 B2 | 8/2016 | Doppelbauer et al. |
| 10,196,972 B2 | 2/2019 | Bergman |

(Continued)

OTHER PUBLICATIONS

2-Cycle Flow Control Valve Clearance Search issued by Kramer IP Search on Oct. 3, 2022, 9 Pages, Virginia, US.

*Primary Examiner* — John Kwon
(74) *Attorney, Agent, or Firm* — Lowe Graham Jones PLLC

(57) ABSTRACT

An exhaust valve includes a toroidal surface about an axis of rotation of the valve. The toroidal surface is positionable over a central exhaust port of an engine when lowered. The valve is raised by an actuator in response to increasing rotational speed of the crankshaft of the engine, thereby enlarging and raising the effective opening of the exhaust port. Lateral valve surfaces on either side of the toroidal surface close lateral exhaust ports when the valve is lowered. The lateral valve surfaces may be cylindrical and formed on fins.

25 Claims, 14 Drawing Sheets

(56) References Cited

U.S. PATENT DOCUMENTS

| | | |
|---|---|---|
| 11,236,651 B2 | 2/2022 | Foxhall et al. |
| 2019/0003350 A1 | 1/2019 | Matheis et al. |
| 2020/0040810 A1* | 2/2020 | Uehane .................. F02B 37/16 |
| 2020/0182167 A1 | 6/2020 | Buchwitz et al. |
| 2020/0408167 A1 | 12/2020 | Johnson et al. |
| 2022/0178282 A1 | 6/2022 | Foxhall et al. |

* cited by examiner

US 11,761,358 B2

MULTI-PORT EXHAUST VALVE FOR TWO-STROKE ENGINES

FIELD OF THE DISCLOSURE

This application relates to two-stroke engines and, more particularly, to exhaust valves for two-stroke engines.

BACKGROUND

Two-stroke engines have an excellent power-to-weight ratio and have fewer moving parts relative to four-stroke engines. Two-stroke engines are therefore the engine of choice in applications where weight is critical, such as snowmobiles, off-road motorcycles, and landscaping tools.

The low weight and simplicity of a two-stroke engine sometimes comes at the cost of efficiency. A two-stroke engine includes a piston that slides within a cylinder. The piston is coupled to a crank within a crankcase and the crank is rotated by the piston. A two-stroke engine lacks cam-actuated valves as are used in a four-stroke engine. Instead, ports are formed in the cylinder wall: an exhaust port that is closer to the top of a cylinder and an intake port that is closer to the crankcase than the exhaust port. The intake port is connected to the crankcase such that as the piston moves toward the crankcase, air displaced by the piston is urged into the cylinder through the intake port. As the piston moves away from the crankcase, a one-way valve allows air to enter the crankcase.

The sequence of events in the operation of a two-stroke engine are as follows:
1. The piston moves toward the crankcase until the top of the piston is below the intake port. This forces air into the cylinder through the intake port.
2. The piston moves away from the crankcase and past the intake port and past the exhaust port until the piston reaches top dead center (TDC), thereby compressing air in the cylinder. Fuel may be mixed with the air while it is drawn into the crankcase and/or injected during or after compression.
3. A spark plug ignites the air-fuel mixture in the cylinder.
4. The combustion of the air-fuel mixture forces the piston toward the crankcase.
5. As the piston passes the exhaust port, combustion gas is allowed to exit through the exhaust port.
6. The process repeats at 1.

The inefficiency of a two-stroke engine arises from various factors. First, the presence of the intake and exhaust ports limits the compression ratio for a given length of piston travel. Second, the exhaust port and intake port are both uncovered at the same time such that fuel-air mixture might escape through the exhaust port where injection is not used.

Due to the excellent power-to-weight ratio of two-stroke engines, they are widely used despite these deficiencies. Many approaches are used to overcome these deficiencies at least partially. One of these is an exhaust valve that varies the effective height of the exhaust port. At low engine speed (i.e., revolutions-per-minute or "RPM"), greater power is achieved if the exhaust valve is lower, since the volume of air that is being compressed is greater. At high RPMs, greater power is achieved if the exhaust valve is higher since exhaust gasses are allowed to begin exiting sooner.

It would be an advancement in the art to provide an improved exhaust valve for use in two-stroke engines.

SUMMARY

In one aspect of the disclosure, an exhaust valve includes a valve body defining an axis of rotation. A central valve surface is defined by the valve body and conforms to a first shape that is symmetric about the axis of rotation. A first lateral valve surface is defined by the valve body, the first lateral valve surface conforming to a second shape that is different from the first shape and that is symmetric about the axis of rotation. The first shape may be a circular toroid.

In some embodiments, the valve body defines a second lateral valve surface defined by the valve body, the central valve surface being positioned between the first lateral valve surface and the second lateral valve surface. The second lateral valve surface may conform to a third shape that is different from the first shape and that is symmetric about the axis of rotation. The second shape and the third shape may each be cylindrical. The first and second lateral valve surfaces may be positioned closer to the axis of rotation than a major portion of the central valve surface. The first and second lateral valve surfaces may be formed on fins extending outwardly from the valve body.

In some embodiments, rods extend outwardly from the valve body, the rods defining the axis of rotation. The valve body may have a concave lower surface extending between the central valve surface and the axis of rotation. The valve body may define a recess on an upper surface thereof, the upper surface being opposite the concave lower surface and positioned between the central valve surface and the axis of rotation.

In another aspect of the disclosure, an engine component includes a cylinder wall defining a cylinder, a central exhaust port, a first lateral exhaust port, and one or more intake ports. A cavity is positioned outside of the cylinder in fluid communication with the central exhaust port and the first lateral exhaust port. The cavity defines a toroidal surface extending outwardly from the central exhaust port.

In some embodiments, the cavity further defines a first cylindrical surface such that an axis of symmetry of the toroidal surface and an axis of symmetry of the first cylindrical surface are substantially parallel and substantially colinear. In some embodiments, the cavity further defines a second cylindrical surface, the axis of symmetry of the toroidal surface and the axis of symmetry of the second cylindrical surface being substantially parallel and substantially colinear. The toroidal surface may be positioned between the first cylindrical surface and the second cylindrical surface. The first cylindrical surface may be part of a first slot defined by the cavity and sized to receive a first cylindrical fin. The second cylindrical surface may be part of a second slot defined by the cavity and sized to receive a second cylindrical fin. In some embodiments, the cavity further defines an exhaust path between the central exhaust port and an exhaust opening.

In another aspect of the disclosure, a valve body defines an axis of rotation and a central valve surface, the central valve surface conforming to a first shape that is symmetric about the axis of rotation. The engine further includes a cylinder wall defining a cylinder, a central exhaust port, and one or more intake ports. The engine includes a cavity outside of the cylinder in fluid communication with the central exhaust port and sized to receive the valve body such that the central valve surface is rotatable relative to the central exhaust port between a low position and a high position. The central valve surface covers a greater amount of the central exhaust port in the low position. A piston is positioned within the cylinder and a crankshaft coupled to the piston. A speed sensor is configured to sense an angular speed of the crankshaft. An actuator is coupled to the valve body and an electronic control unit is coupled to the speed sensor and the actuator. The electronic control unit is programmed to cause the actuator to adjust a position of the valve body based on outputs of the speed sensor at an angular speed of rotation that is less than the angular speed of the crankshaft.

In some embodiments, the electronic control unit is programmed to cause the actuator to move the valve body toward the low position in response to decrease in the angular speed of the crankshaft. The electronic control unit may be programmed to cause the actuator to move the valve body toward the high position in response to increase in the angular speed of the crankshaft. In some embodiments, the central valve surface does not completely cover the central exhaust port when in the low position.

In some embodiments, the first shape is a circular toroid. The valve body may include a first lateral valve surface, the first lateral valve surface conforming to a second shape that is different from the first shape and that is symmetric about the axis of rotation. The valve body may define a second lateral valve surface, the central valve surface being positioned between the first lateral valve surface and the second lateral valve surface. The second lateral valve surface may conform to a third shape that is different from the first shape and that is symmetric about the axis of rotation. The first shape and the second shape may each be a cylinder. In some embodiments, the first lateral valve surface is defined by a first fin extending outwardly from the valve body and the second lateral valve surface is defined by a second fin extending outwardly from the valve body.

BRIEF DESCRIPTION OF THE DRAWINGS

Preferred and alternative examples of the present disclosure are described in detail below with reference to the following drawings.

DETAILED DESCRIPTION

Figure 1A:
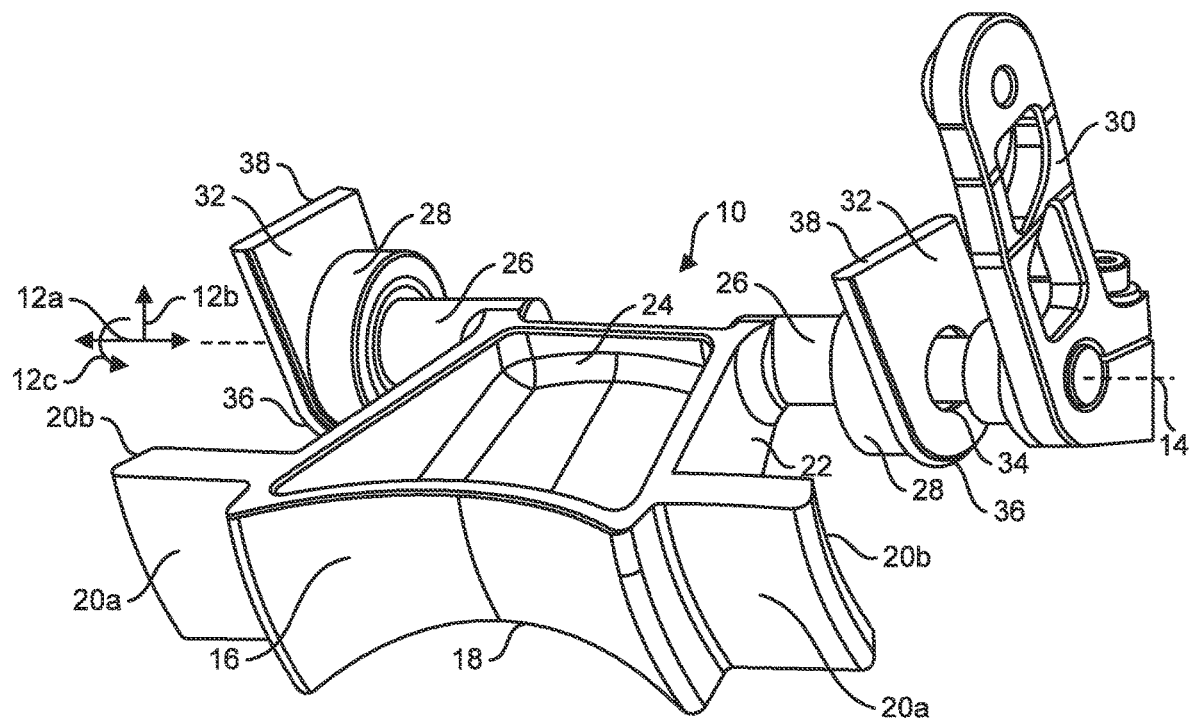
FIG. 1A is an isometric view of an exhaust valve in accordance with an embodiment of the present disclosure.

An exhaust valve according to embodiments disclosed herein is provided that comprises a rotatable valve body including a first valve that is selectively positionable along an exhaust port of a cylinder, and optionally at least one auxiliary valve selectively positionable along an auxiliary exhaust port of the cylinder. The position of the auxiliary valve on the valve body may be fixed with respect to the position of the first valve on the valve body.

The exhaust valve 10 according to the embodiments disclosed herein may be understood with respect to an axial direction 12a, a radial direction 12b, and a circumferential direction 12c. The axial direction 12a may be defined as substantially (e.g., within 2 degrees of) parallel to the axis of rotation 14 of the exhaust valve 10. The axial direction 12a may also be defined as substantially (e.g., within 2 mm of) colinear with the axis of rotation 14 of the exhaust valve 10.

The exhaust valve 10 may include a central valve surface 16. The valve surface 16 may conform to an arcuate shape rotated in the circumferential direction 12c about the axis of rotation 14. The valve surface 16 may conform to a toroidal shape, such as a circular toroid (i.e., torus) having a radius of revolution (R) and a section radius (r). For example, each point on the valve surface 16 may be within 0.1 mm of a toroidal shape. In such embodiments, the valve surface 16 is concave in planes intersecting and parallel to the axis of rotation 14. The section radius r corresponds to the radius of the cylinder with which the exhaust valve 10 is used. For example, r may be equal to the radius of the cylinder. In other embodiments, r is equal to the radius of the cylinder plus a non-zero tolerance X, where X is a value between 0.1 and 2 percent of r.

The exhaust valve 10 defines a perimeter 18 that is the boundary of the central valve surface 16 that conforms to the toroidal shape. The perimeter 18 may have a shape corresponding to the exhaust port with which it is used. For example, the perimeter 18 may have a width that is equal to the width of the exhaust port parallel to the axial direction 12a plus an additional amount such that the valve surface 16 extends outwardly on either side of the exhaust port. The arc length of the perimeter 18 parallel to the circumferential direction 12c at the center of the perimeter 18 along the axial direction 12a may be less than or equal to the height of the exhaust port inasmuch as the exhaust port remains open throughout the range of motion of the exhaust valve 10. The shape of the perimeter 18 in the illustrated embodiment is a wedge-shaped section of the toroidal shape. However, other shapes may also be used.

The exhaust valve 10 may include lateral valve surfaces 20a. The lateral valve surfaces 20a may conform to a same or different arcuate shape rotated in the circumferential direction 12c about the axis of rotation 14. For example, the lateral valve surfaces 20a may conform to a cylinder having an axis of symmetry substantially parallel to and substantially colinear with the axis of rotation 14. In other embodiments, the lateral valve surfaces 20a may conform to a cone, circular toroid, other circular shape or revolution of some other shape about the axis of rotation. The lateral valve surfaces 20a may be formed on fins 20b extending outwardly from the central valve surface 16 and these fins 20b may likewise have cylindrical surfaces opposite the lateral valve surfaces 20a that conform to a smaller cylinder having the axis of symmetry thereof substantially parallel to, and substantially colinear, with the axis of rotation 14.

In some embodiments, the lateral valve surfaces 20a are located closer to the axis of rotation 14 than a major portion of the central valve surface 16. For example, in the illustrated embodiment, the lateral valve surfaces 20a extend no more than between 0 and 5 mm outwardly from a point on the central valve surface 16 that is closest to the axis of rotation 14.

The central valve surface 16 may be formed on an end of a valve body 22. The lateral valve surfaces 20a may be defined by the fins 20b that extend laterally outward from the valve body 22. The valve body 22 may define a recess 24 extending inwardly from the upper surface thereof. The upper and lower surfaces of the valve body 22 may conform to a wedge shape with various features, such as the recess 24 extending inwardly from this wedge shape.

Pivot rods 26 may extend from one or both sides of the valve body 22 and may include cylindrical portions having the axes of symmetry thereof substantially parallel to and substantially colinear with the axis of rotation 14. The pivot rods 26 may each pass through a bearing 28, such as a cartridge bearing, bushing, or other type of bearing. One or both of the pivot rods 26 may be coupled to a lever arm 30 that extends outwardly from the axis of rotation 14 in the radial direction 12b.

The pivot rods 26 may further each pass through seal plates 32, such as through openings 34 defined by the seal plates 32. The portions of the pivot rods 26 passing through the openings 34 may be smaller in diameter than the portions passing through the bearings 28 such that the seal plates 32 hinder movement of the pivot rods 26 along the axial direction 12a. In the illustrated embodiment, the bearings 28 are positioned between the seal plates and the valve body 22.

The seal plates 32 may serve to contain exhaust gasses and may be made of a heat tolerant material, such as nitrile. In some embodiments, the seal plates 32 are formed of steel covered by nitrile. The seal plates 32 may be made of any material used to form engine gaskets as known in the art. The seal plates 32 may include a curved lower edge 36 and a straight upper edge 38. The lower edge 36 of each seal plate 32 may be shaped to conform to a slot in a cylinder head within which the seal plate 32 is positioned.

Figure 1B:
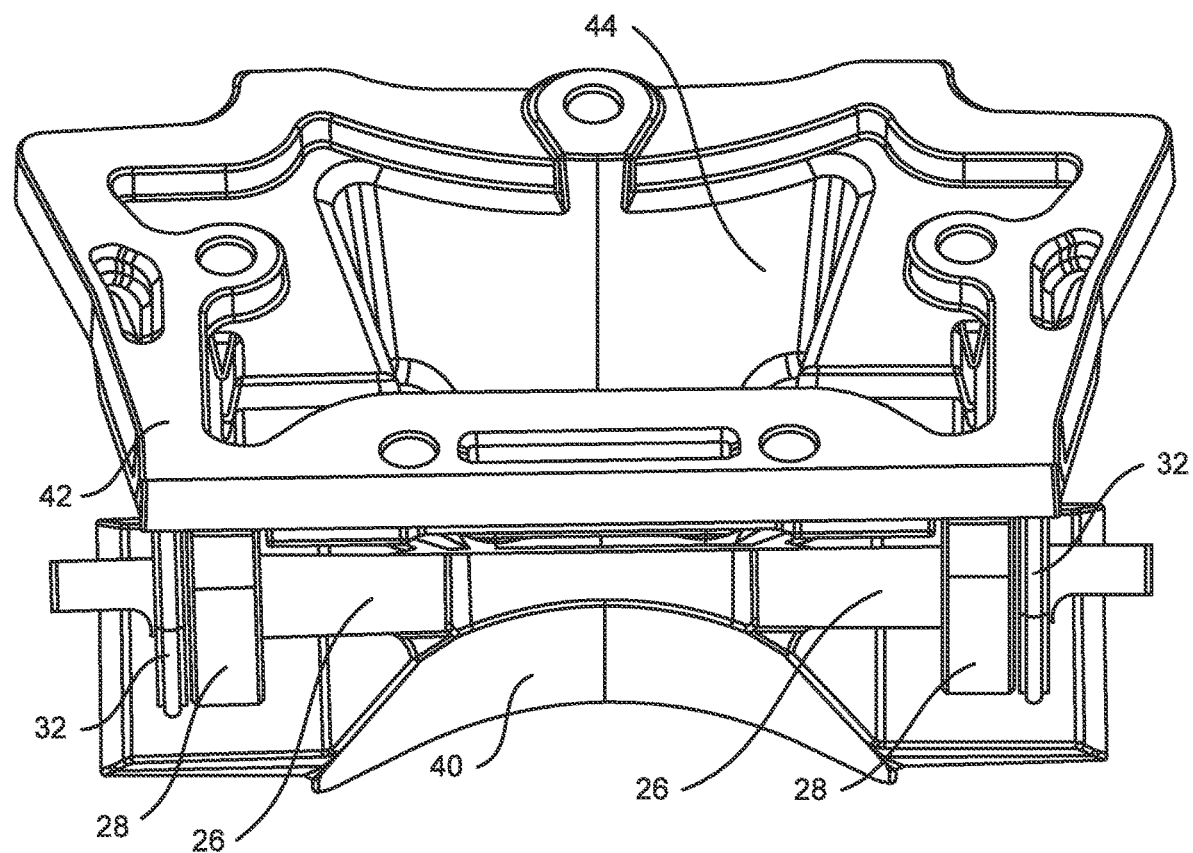
FIG. 1B is a lower isometric view of the exhaust valve in accordance with an embodiment of the present disclosure.

Referring to FIG. 1B, the lower surface 40 of the valve body 22 forms part of the channel through which exhaust gasses flow out of the cylinder of the two-stroke engine. In some embodiments, the lower surface 40 may therefore be concave and extend from the central valve surface 16 partially or completely to the axis of rotation 14. In the illustrated embodiment, the concave lower surface 40 intersects the central valve surface 16 and may define the lower edge of the central valve surface along with a chamfered or beveled transition between the concave lower surface 40 and the central valve surface 16.

In the illustrated embodiment, the concave lower surface 40 extends across the pivot rods 26 in the radial direction 12b such that a portion of the concave lower surface 40 extends inwardly from the outer surfaces of the pivot rods 26, such as along the radial direction 12b. The concave lower surface 40 may conform to a cylinder, cone, elliptical rod, or other rounded shape that has a straight or curved central axis. The central axis to which the concave lower surface conforms may be offset from the axis of rotation 14 and the concave lower surface 40 may intersect the axis of rotation 14 or be offset therefrom, such as by between 0 and 10 mm.

FIG. 1B further shows a cover 42 that is used to cover a recess containing the valve 10. The cover 42 may include a recess 44 extending inwardly from an upper surface, thereby defining a protrusion extending outwardly from the lower surface of the cover 42. The protrusion may be sized and positioned to insert within the recess 24 as discussed in greater detail below.

Figure 2:
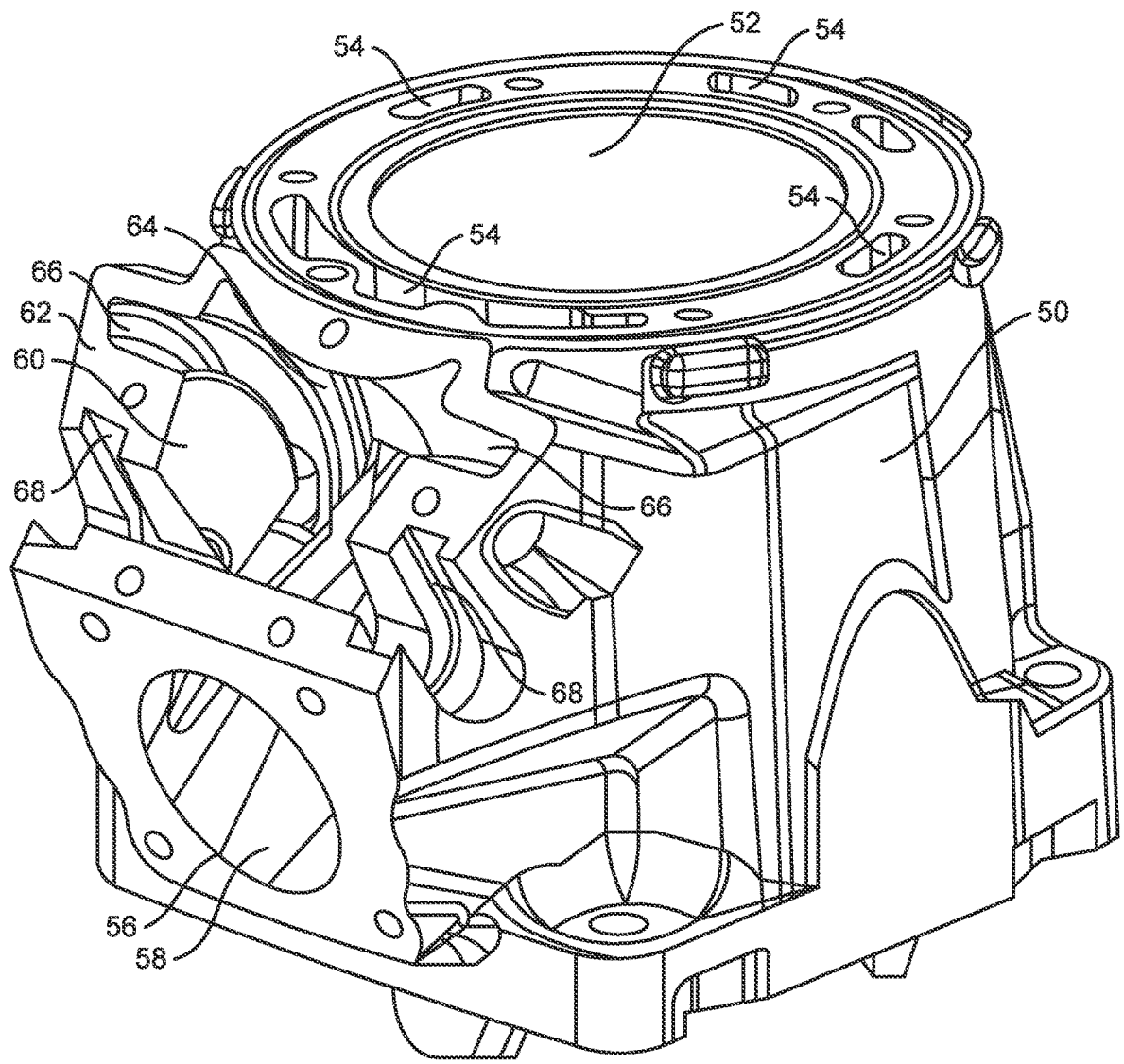
FIG. 2 is an isometric view of a cylinder and exhaust port of a two-stroke engine for receiving the exhaust valve in accordance with an embodiment of the present disclosure.

Referring to FIG. 2, the two-stroke engine may include a cylinder head including cylinder wall 50 defining a cylinder 52 within which a piston moves. The cylinder wall 50 may define openings 54 and passageways for receiving the flow of coolant. Alternatively, the two-stroke engine may be air-cooled such that the cylinder wall 50 includes fins for improving heat transfer.

The cylinder wall 50 defines an exhaust opening 56 in fluid communication with an exhaust port (see exhaust port 90 shown in FIGS. 5, 6, and 9A to 10B) intersecting the cylinder 52. The exhaust opening 56 may connect to a muffler directly or by way of an exhaust pipe and/or manifold connected to one or more other cylinder heads. A surface 58 of an exhaust path extends between the cylinder 52 and the exhaust opening 56. The cylinder wall 50 may define an opening 60 above the exhaust path and intersecting the surface 58. The exhaust vale 10 may be inserted into the opening 60. The cylinder wall 50 may define a sealing surface 62 extending completely or partially around this opening 60. For example, the sealing surface 62 may cooperate with the seal plates 32 (see FIGS. 1A and 1B) to restrict flow of exhaust gasses when the cover 42 is placed over the sealing surface 62. In the illustrated embodiment, the sealing surface 62 lies on a plane that is at a non-parallel and non-perpendicular angle relative to the axis of symmetry of the cylinder 52. For example, for a first plane to which the axis of symmetry of the cylinder 52 is normal, the sealing surface may lie on a second plane that is at an angle of between 15 and 45 degrees relative to the first plane.

Figure 3:
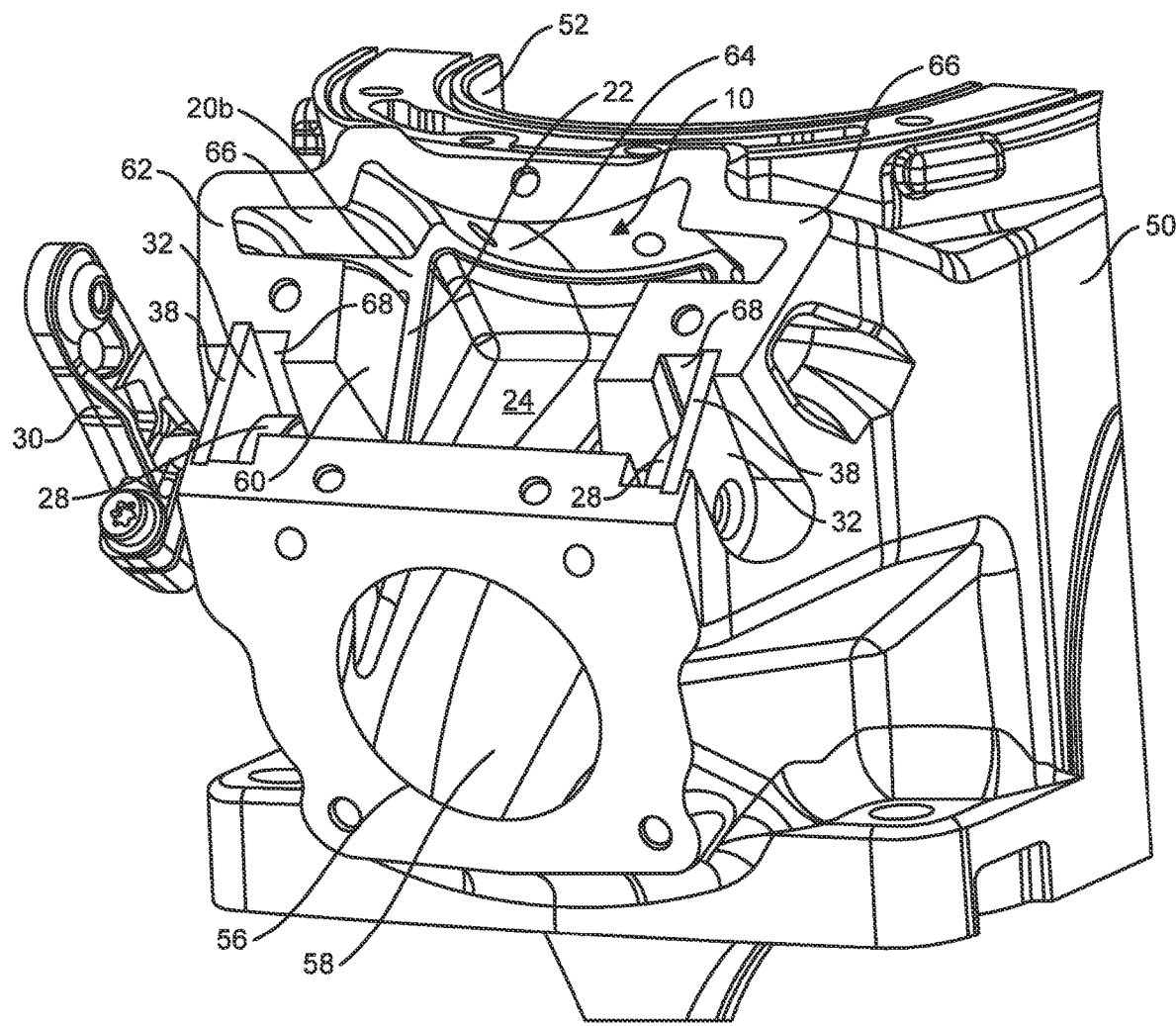
FIGS. 3 and 4 are isometric views of the cylinder and exhaust port having the exhaust valve installed in accordance with an embodiment of the present disclosure.
Figure 4:
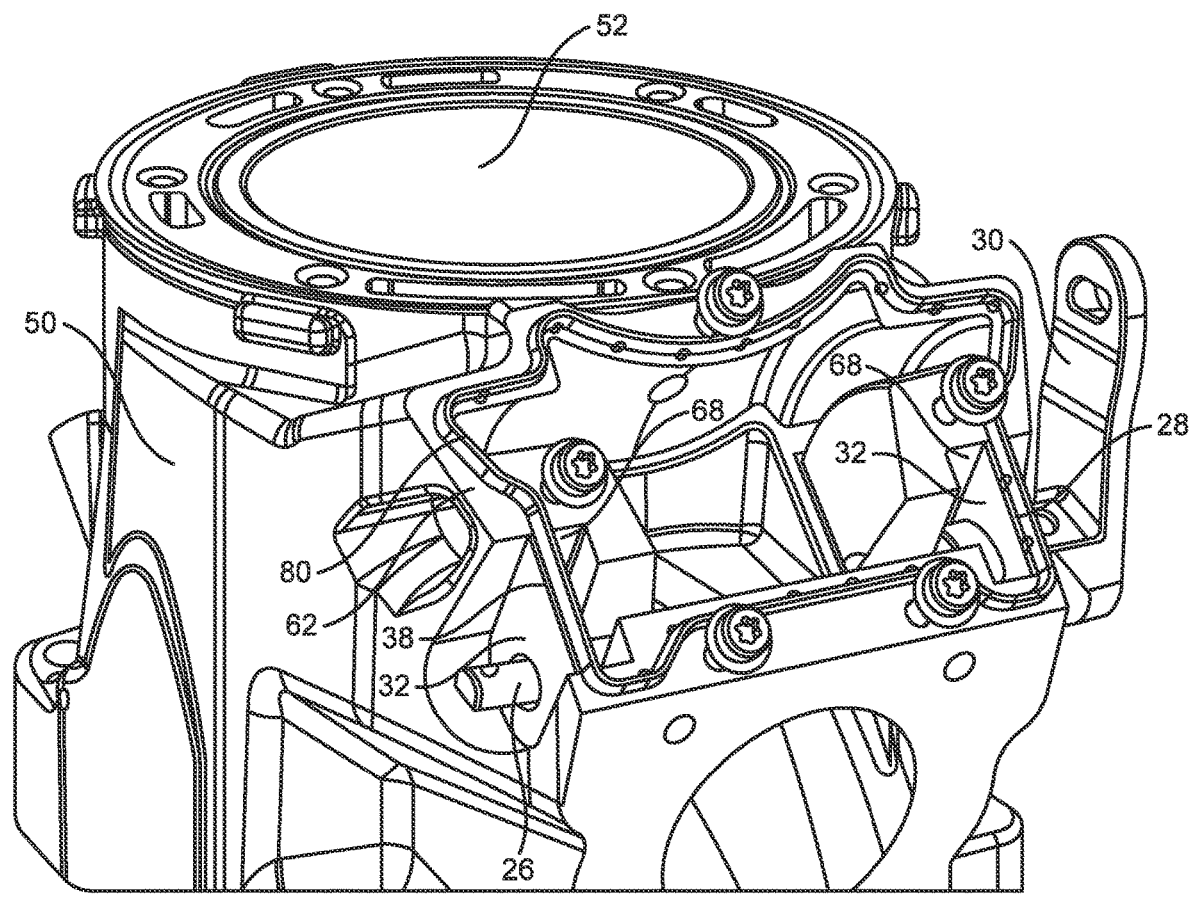

The cylinder wall 50 may define one or more surfaces for engaging with the exhaust valve 10 (FIGS. 1, 3, and 4). For example, the cylinder wall 50 may define a curved or toroidal surface 64 for interfacing with the central valve surface and slots 66 on either side of the toroidal surface 64 for receiving the lateral valve surfaces 20a. The toroidal surface 64 and slots 66 may be sized and positioned to allow the central valve surface 16 and lateral valve surfaces 20a (and fins 20b on which these may be formed) to pass therethrough without contact. In particular, clearances may be between 0.1 and 2 mm to enable free movement while reducing flow of exhaust gasses.

The cylinder wall 50 may further define seats 68 for receiving the bearings 28. The seats 68 may also receive the seal plates 32. Alternatively, separate slots may be defined by the cylinder wall 50 for receiving the seal plates 32. The seats 68 or separate slots may be rounded to receive the rounded lower edges 36 of the seal plates 32. A space between the seats 68 may be sized to receive the valve body 22.

In the illustrated example, various features 56-68 are described as being formed in the cylinder wall 50 such that a single monolithic piece of material defines the cylinder 52 as well as the features 56-68. In other embodiments, features 56-68 are formed in one or more different pieces of material that are then fastened to the cylinder wall 50 over the exhaust port.

FIGS. 3 and 4 illustrate the exhaust valve 10 following insertion through the opening 60. In the illustrated example, the seal plates 32 are seated within the seats 68, the bearings 28 are positioned within seats 68. The valve body 22 is positioned such that the fins 20b are positioned within the slots 66 and the central valve surface 16 is facing the toroidal surface 64. The pivot rods 26 protrude outwardly from at least one of the seal plates 32 and the lever arm 30 is secured to either the left pivot rod 26 (FIG. 3) or the right pivot rod 26 (FIG. 4.)

As shown in FIG. 4, a seal or gasket 80 may be positioned on the sealing surface 62 extending around the opening. The gasket 80 may extend across the seats 68 and rest on the seal plates 32, such as the upper edges 38 of the seal plates 32. The gasket 80 may be made using any material known to be usable to make engine gaskets as known in the art. In the illustrated example, the gasket 80 is made of nitrile.

Figure 5:
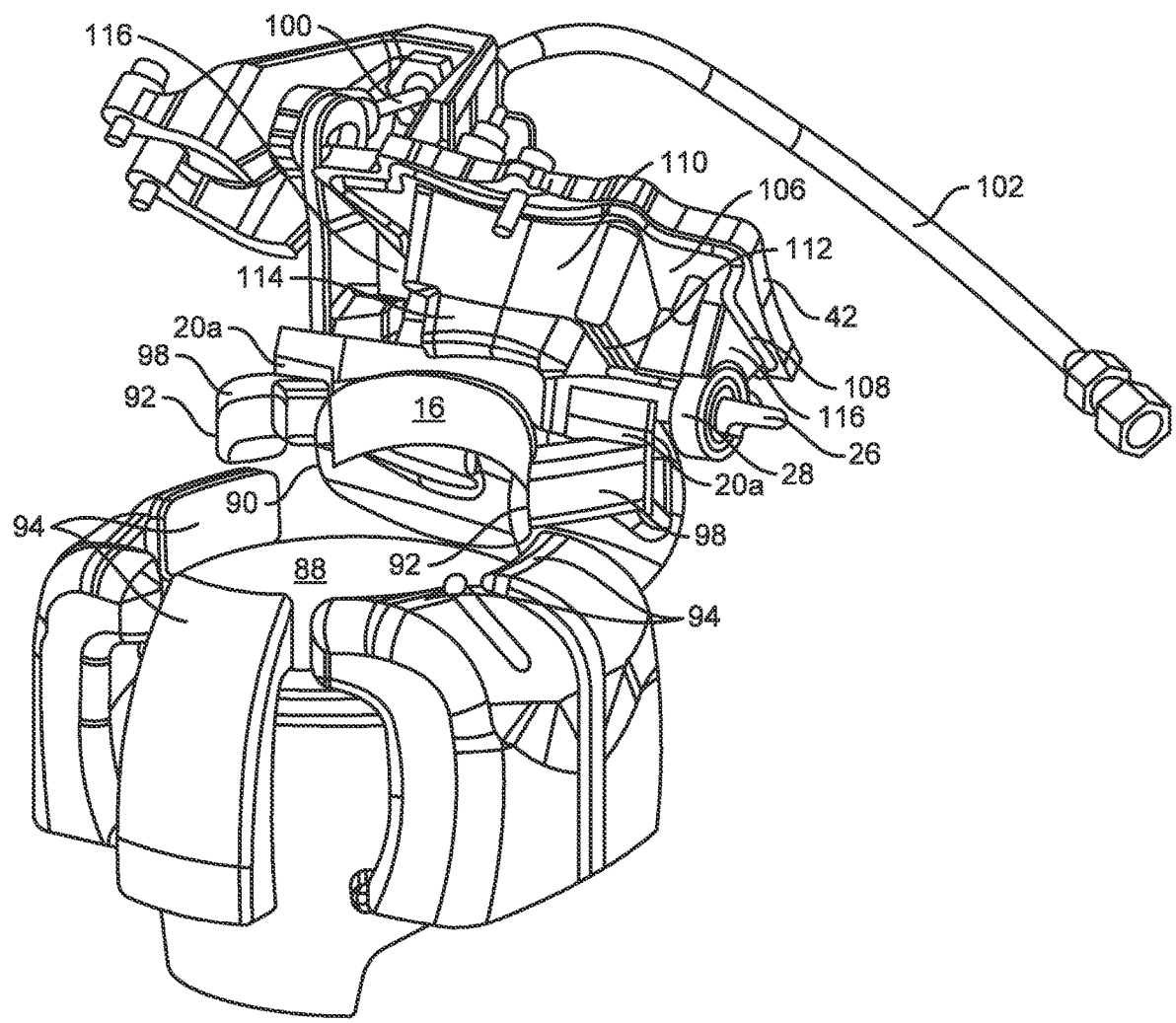
FIG. 5 is an isometric view of the exhaust valve and exhaust and intake ports with the exhaust valve closed in accordance with an embodiment of the present disclosure.
Figure 6:
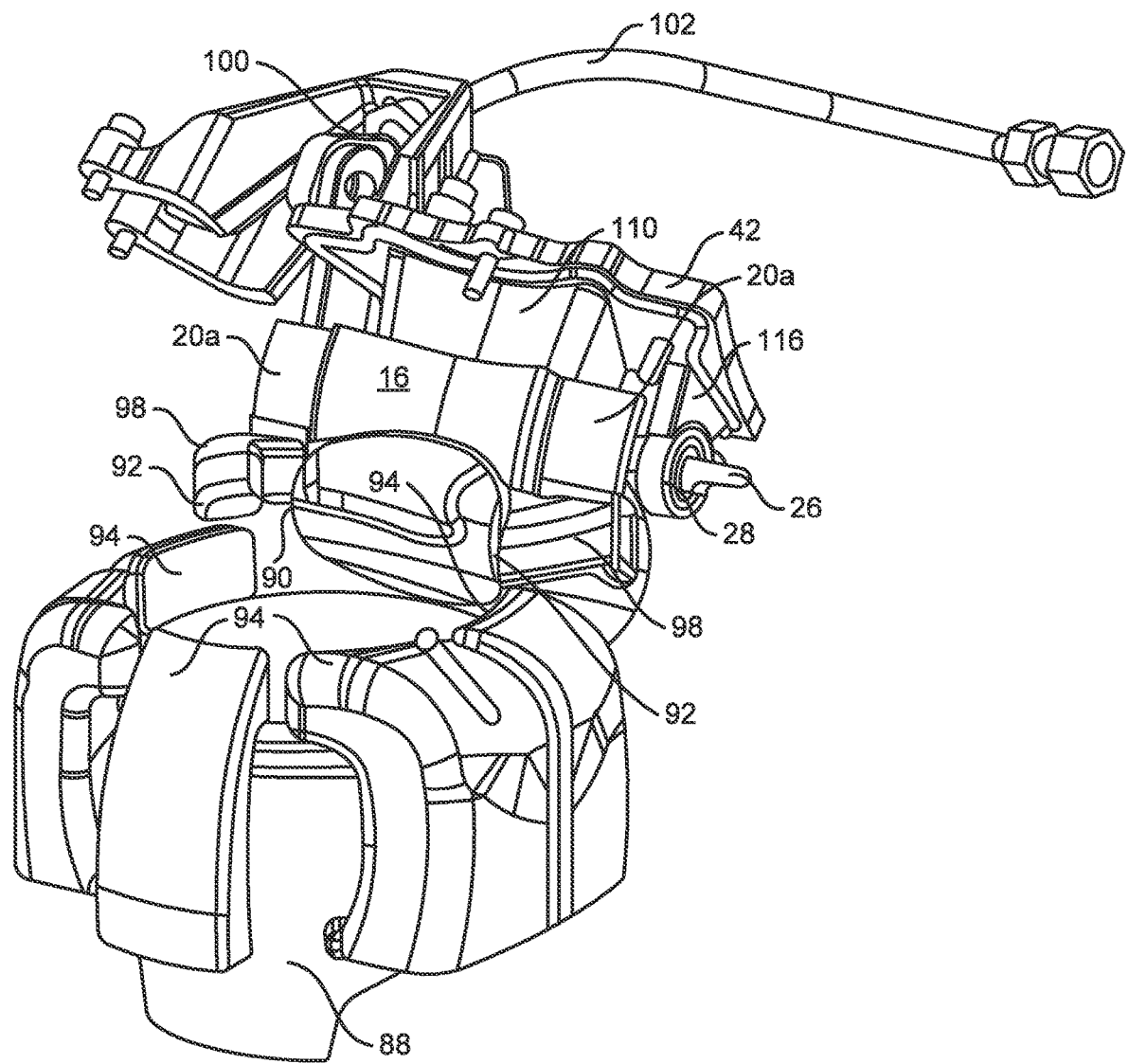
FIG. 6 is an isometric view of the exhaust valve and exhaust and intake ports with the exhaust valve open in accordance with an embodiment of the present disclosure.

FIGS. 5 and 6 illustrate operation of the exhaust valve 10. FIGS. 5 and 6 illustrate the piston 88 of a two-stroke engine. The cylinder wall 50 has been removed in the views of FIGS. 5 and 6 to show the configuration of a central exhaust port 90, lateral exhaust ports 92, and intake ports 94 that are defined by the cylinder wall 50. The central exhaust port 90 and lateral exhaust ports 92 are in fluid communication with the exhaust path formed at least partially by the lower surface 58 of the exhaust path and the lower surface of the valve body 22. The exhaust ports 90 are positioned above the intake ports 94 (further from the crank shaft and closer to the top dead center (TDC) position of the piston 88). Although multiple intake ports 94 are shown, a single intake port 94 may be used in some implementations. As is apparent, the lateral valve surfaces 20a are offset outwardly from the lateral ports 92 and may be connected to the lateral ports 92 by channels 98 passing through the cylinder wall 50. Each channel 98 may pass through one or more surfaces defining one of the slots 66.

FIGS. 5 and 6 further show a connector 100 for connecting an actuator to the lever arm 30. In the illustrated embodiment, the connector 100 is embodied as a flexible rod or cable within a sleeve 102. The connector 100 may be coupled to an electrical motor, solenoid, pneumatic piston, hydraulic piston, mechanical governor, or other driving mechanism. The connector 100 may pull on the lever 30 such that increasing tension results in raising of the valve body 22 and increasing the effective size and height of an exhaust port. Where the connector 100 is a flexible rod, the rod may be placed in compression to drive the valve body 22 down and decrease the effective size and height of the exhaust port. In other embodiments a spring or other biasing member engages the lever 30 and urges the valve body 22 down in the absence of tension on the connector 100. In other embodiments, the connector 100 is a tube conducting pressurized air or hydraulic fluid and a pneumatic or hydraulic piston that is connected to the lever arm 30 and is driven by fluid within the connector 100. In other embodiments, the connector 100 is an electrical wire connected to an electric motor or solenoid that is connected to the lever arm 30.

FIGS. 5 and 6 further show an implementation of a cover 42 for the opening 60. A lower surface 106 of the cover 42 interfaces with the sealing surface 62. In the illustrated embodiment, the lower surface 106 defines a groove 108 for receiving the gasket 80. In some embodiments, the upper edges 38 of the seal plates 32 also seat within the groove 108.

A protrusion 110 may extend from the lower surface 106 and be sized to insert within the recess 24. The protrusion 110 may be formed monolithically with the cover 42 or fastened thereto. The protrusion 110 may be hollow and may be formed by the recess 44 extending through the upper surface of the cover 42. In the illustrated embodiment, the protrusion 110 is tapered such that the protrusion 110 becomes smaller in cross section with distance from the lower surface 106 and may include a shoulder 112 that forms a step that extends inwardly and connects to a distal portion 114 that extends outwardly from the shoulder 112 and outwardly from the lower surface 106. The reduced size distal portion 114 may be sized to insert within the recess 24 of the valve body 22. When inserted within the recess 24, the shoulder 112 may press against the upper surface of the valve body 22.

Bearing seats 116 may be secured to the lower surface of the cover 42 by fasteners or monolithic formation therewith. The bearing seats 116 may be positioned on either side of the protrusion 110 and engage the bearings 28 when the cover 42 is installed against the sealing surface 62. Each bearing 26 may therefore held in place between a bearing seat 68 (FIGS. 3, 4) and a bearing seat 116 (FIGS. 5, 6). The seats 68, 116 may define cylindrical surfaces sized to engage the outer surfaces of the bearings 28 embodied as cartridge bearings.

Referring specifically to FIG. 5, at a first engine RPM, the actuator pivots the exhaust valve 10 to the illustrated lowered configuration in which a portion of the central exhaust port 90 is covered and the lateral ports 92 are completely covered by the lateral valve surfaces 20. Covering the lateral ports 92 may include covering openings of the channels 98 opposite the lateral ports 92. As used herein, "completely" covering the lateral ports 92 or completely covering the channels 98 may include moving the exhaust valve 10 down (toward the lower surface 58 of the exhaust path) to its lowest position such that the lateral valve surfaces 20a cover at least 90 percent, at least 95 percent, or at least 99 percent, of the area of the lateral ports 92 or openings of the channels 98. Stated differently, in some embodiments, a width of a gap around the perimeter of each lateral valve surface 20a when the exhaust valve 10 is pivoted down to its lowermost position is more than 2 mm, 1 mm, or 0.1 mm at any point on the gap.

Referring specifically to FIG. 6, at a second engine RPM that is higher than the first engine RPM, the exhaust valve 10 is pivoted to the illustrated raised configuration. The second RPM may be between 1000 and 1500 RPM higher than the first RPM for some two-stroke engines. In the raised configuration, the exhaust valve 10 is pivoted to its uppermost position away from the lower surface 58 of the exhaust path. In the illustrated example, the lower edge of the central valve surface 18 is positioned above or flush with the top of the central exhaust port 90. In other implementations, the lower edge of the central valve surface 18 may be slightly below the top of the central exhaust port 90, such by less than 2 mm.

In the lowered configuration, the distal portion 114 of the protrusion 110 may be positioned above the recess 24 whereas in the raised configuration, the distal portion 114 of the protrusion 110 may be positioned within the recess 24 and the shoulder 112 may press against the upper surface of the valve body 22. It may be undesirable in some applications for there to be a void above the valve body 22 when the valve body 22 is in the lowered configuration. A void may result in undesirable resonances and pressure waves and may accumulate unburned fuel that may later ignite. The protrusion 110 may therefore be used to occupy this void at least partially.

Figure 7:
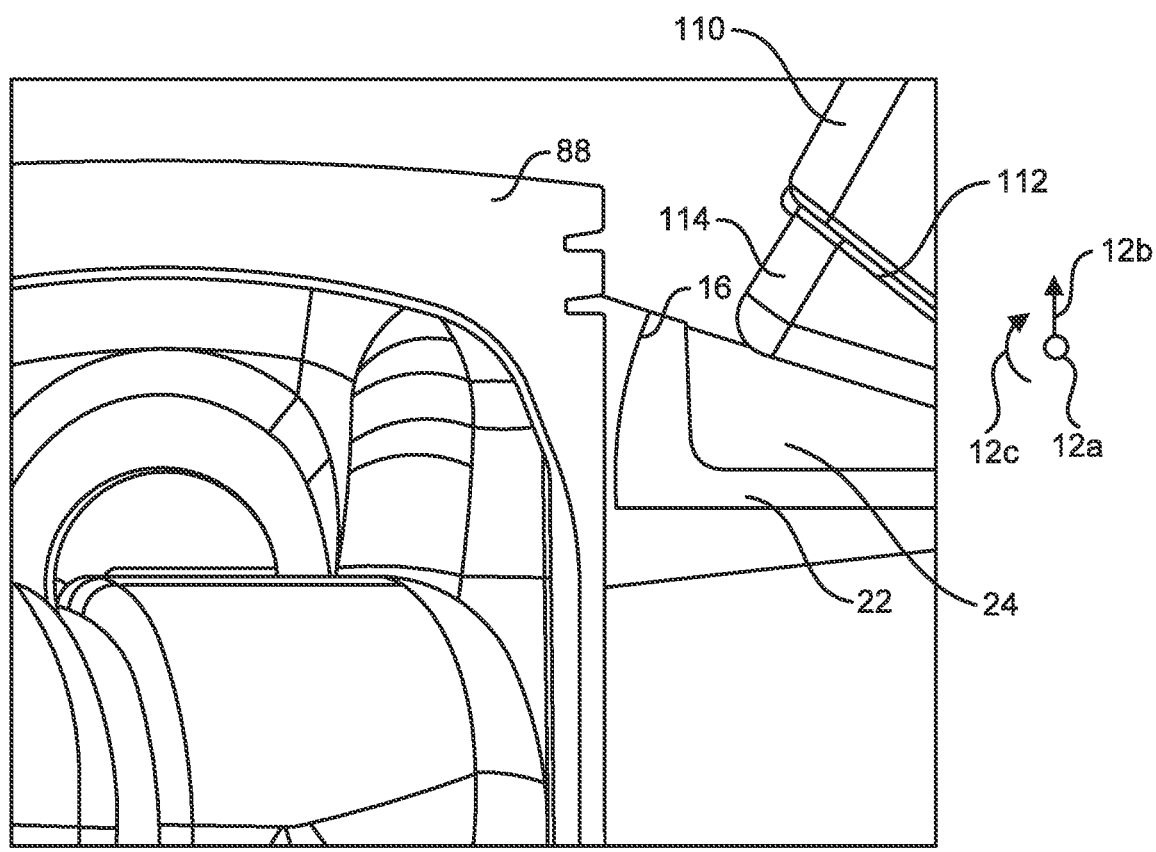
FIG. 7 is a partial cutaway view of a piston and the exhaust valve in accordance with an embodiment of the present disclosure.

Referring to FIG. 7, when the valve 10 is in the lowered configuration, the central valve surface 16 is adjacent the piston 88 and may be separated by a gap effective to reduce blow by of fuel-air mixture during the compression. For example, the gap may be chosen to be between 0.1 and 1 mm. In some implementations, the piston 88 and/or piston rings encircling the piston 88 contact the valve surface 16 during operation. Where the valve surface 16 is toroidal, there may be a range of positions of the valve 10 at which the central valve surface 16 is positioned adjacent the piston 88 separated by the above-mentioned gap or contacting the piston 88. For example, the range may be from 15 to 40 degrees.

Figure 8:
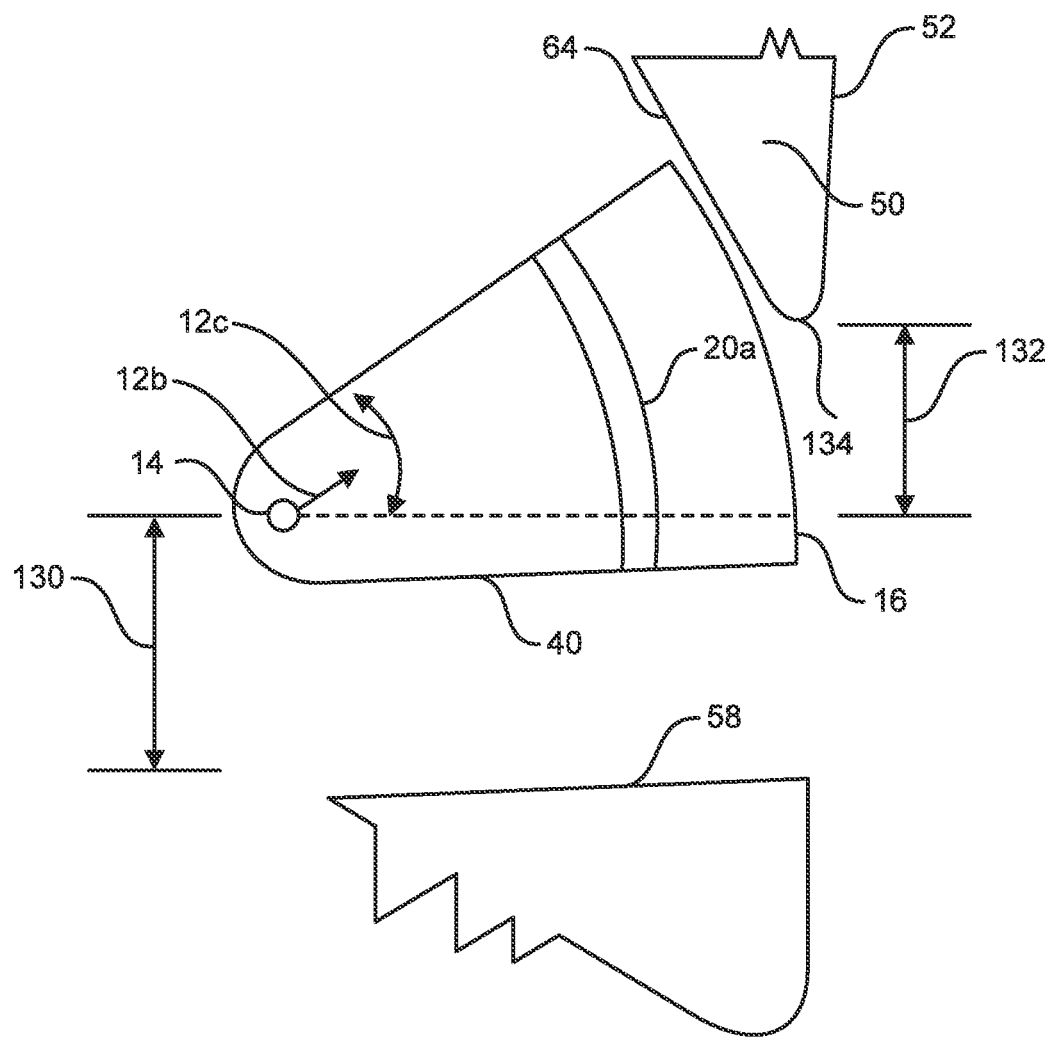
FIG. 8 is a schematic diagram of the exhaust valve and cylinder in accordance with an embodiment of the present disclosure.

FIG. 8 is a schematic representation of the exhaust valve 10 during use. The axis of rotation 14 may be positioned a distance 130 above the lower surface 58 of the exhaust path and a distance 132 below the top 134 of the central exhaust port 90. As the distance 130 is reduced, the thickness of the cylinder wall connecting to the top 134 of the central exhaust port 90 increases. The distance 130 may be limited by the need to have an exhaust path having sufficient cross-sectional area to conduct exhaust gasses out of the cylinder 52.

FIGS. 9A, 9B, 10A, and 10B illustrate the exhaust channel defined by the surface 40 of the exhaust valve 10 and the surface 58 defined by the cylinder 50 and/or a structure secured to the cylinder 50.

Figure 9A:
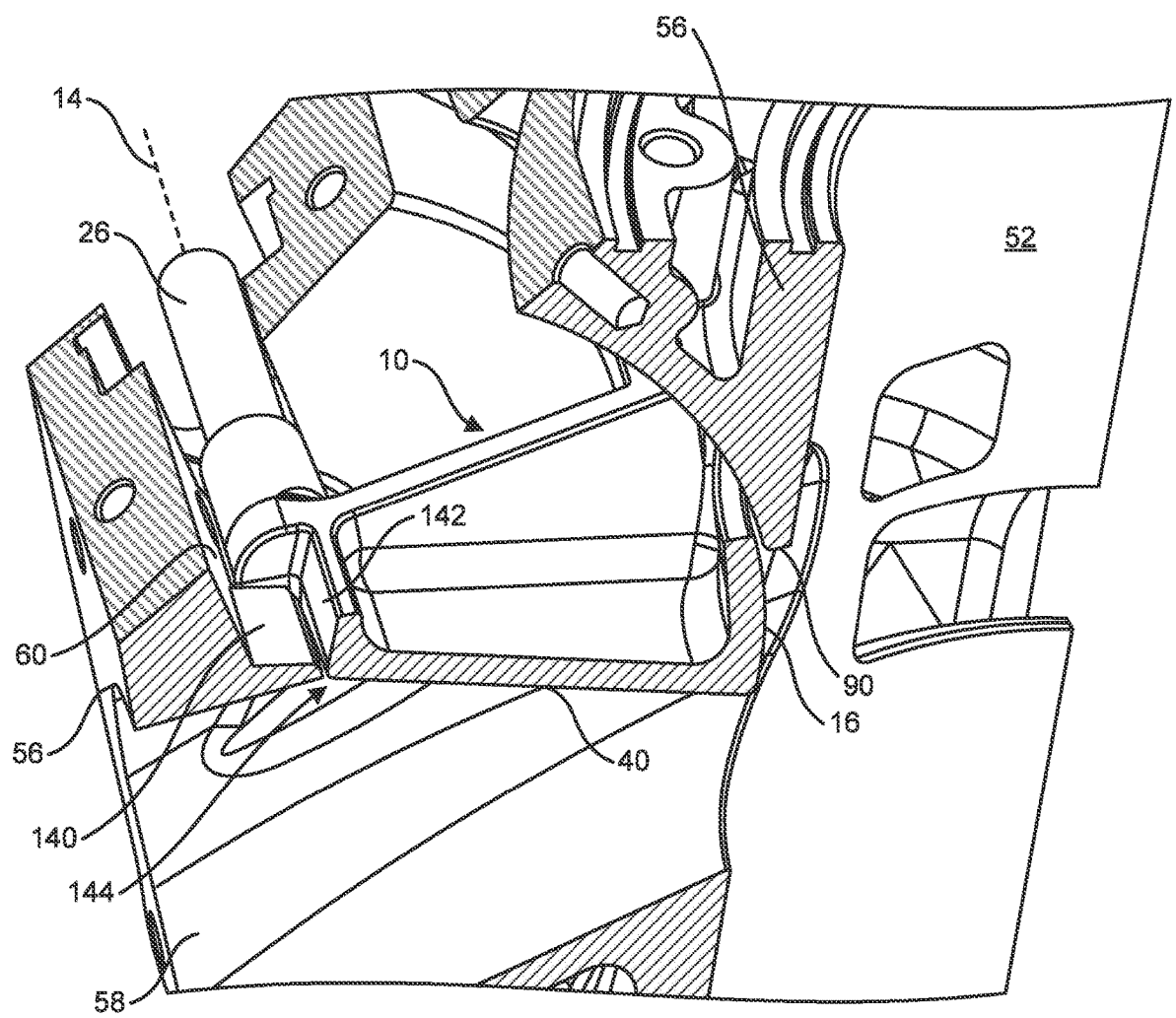
FIGS. 9A and 9B are cross-sectional views of a cylinder with the exhaust valve closed accordance with an embodiment of the present disclosure.
Figure 9B:
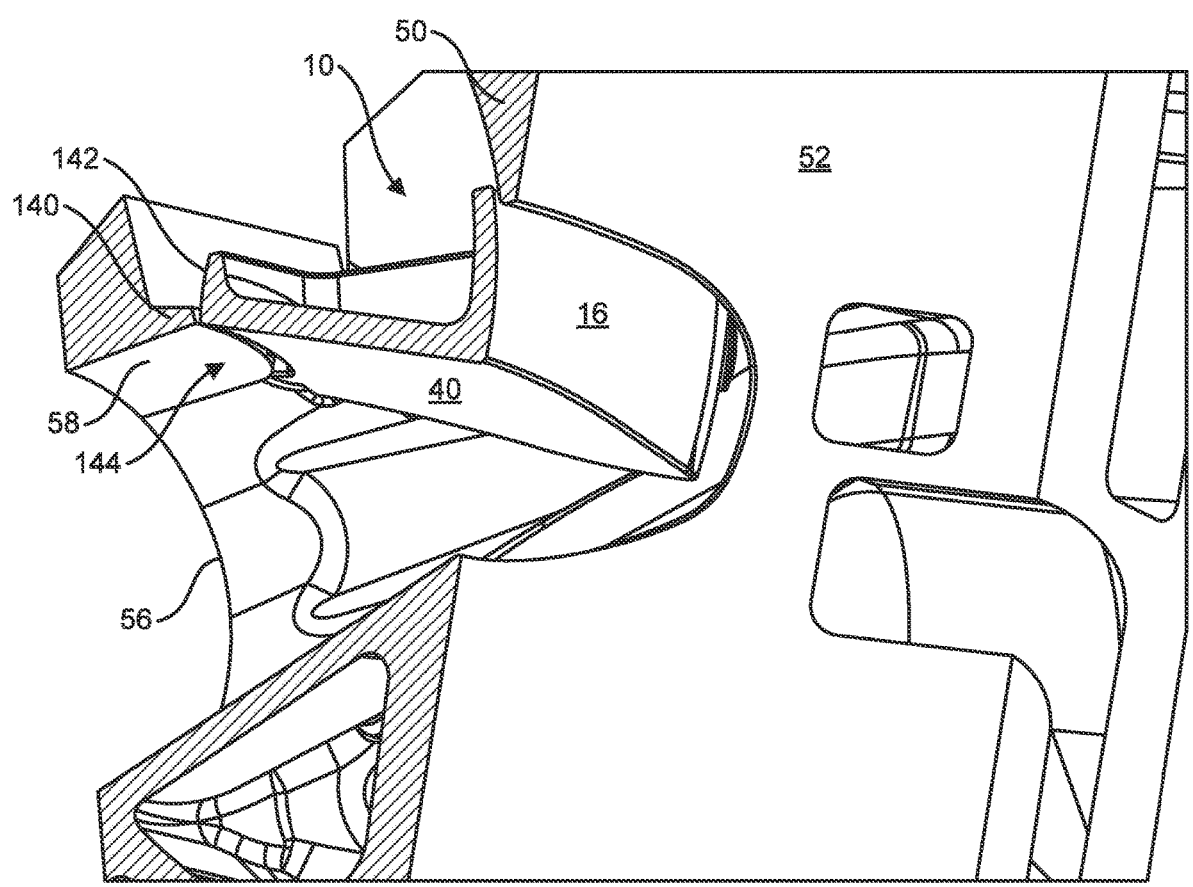

FIGS. 9A and 9B illustrate the exhaust valve 10 in the lowered configuration. The opening 60 may define a protrusion 140 that extends toward the valve 10. In some embodiments, the valve 10 may define a recess 142 into which the protrusion 140 extends such that a gap 144 is present between the recess 142 and the protrusion 144. The axis of rotation 14 may pass through the recess 144 and may be positioned in or above (e.g., having the valve 10 positioned between the axis of rotation 14 and the surface 58) the gap 144. In this manner, the gap 144 remains substantially (e.g., within 3 mm) uniform through the rotation of the valve 10 between the lowered and raised configurations. In some embodiments, the protrusion 140 and recess 142 are sized and position relative to the axis of rotation 14 such that the gap 144 remains less than 3 mm, less than 2 mm, or less than 1 mm throughout the movement of the valve 10 between the lowered and raised configurations.

The curved lower surface 40 is separate by the gap 144 from the surface 58. At the gap 144 (e.g., within 5 mm of the gap), the curved lower surface 40 may conform to the surface 58, such as having a radius of curvature within 3 mm of that of the surface 58 at the gap (e.g., within 5 mm of the gap). For example, there may be a smooth shape (e.g., cylindrical, conical, horn, or other shape) defined by the surface 58 and the curved lower surface 40 at the gap 144 may be within 3 mm of this surface when in the lowered configuration. In this manner, there is a smooth aerodynamic path from the exhaust port 90 to the exhaust opening 56 with the exception of the gap 144, any gap present between the exhaust valve 10 and the exhaust port 90, and chamfered edges of the exhaust opening 90, exhaust port 90, exhaust valve 10, and recess 142. As used herein, "smooth" shall be understood as having no portion with a radius of curvature smaller than 90 percent of the smallest radius of curvature defined by either of the exhaust port 90 and the opening 56.

Figure 10A:
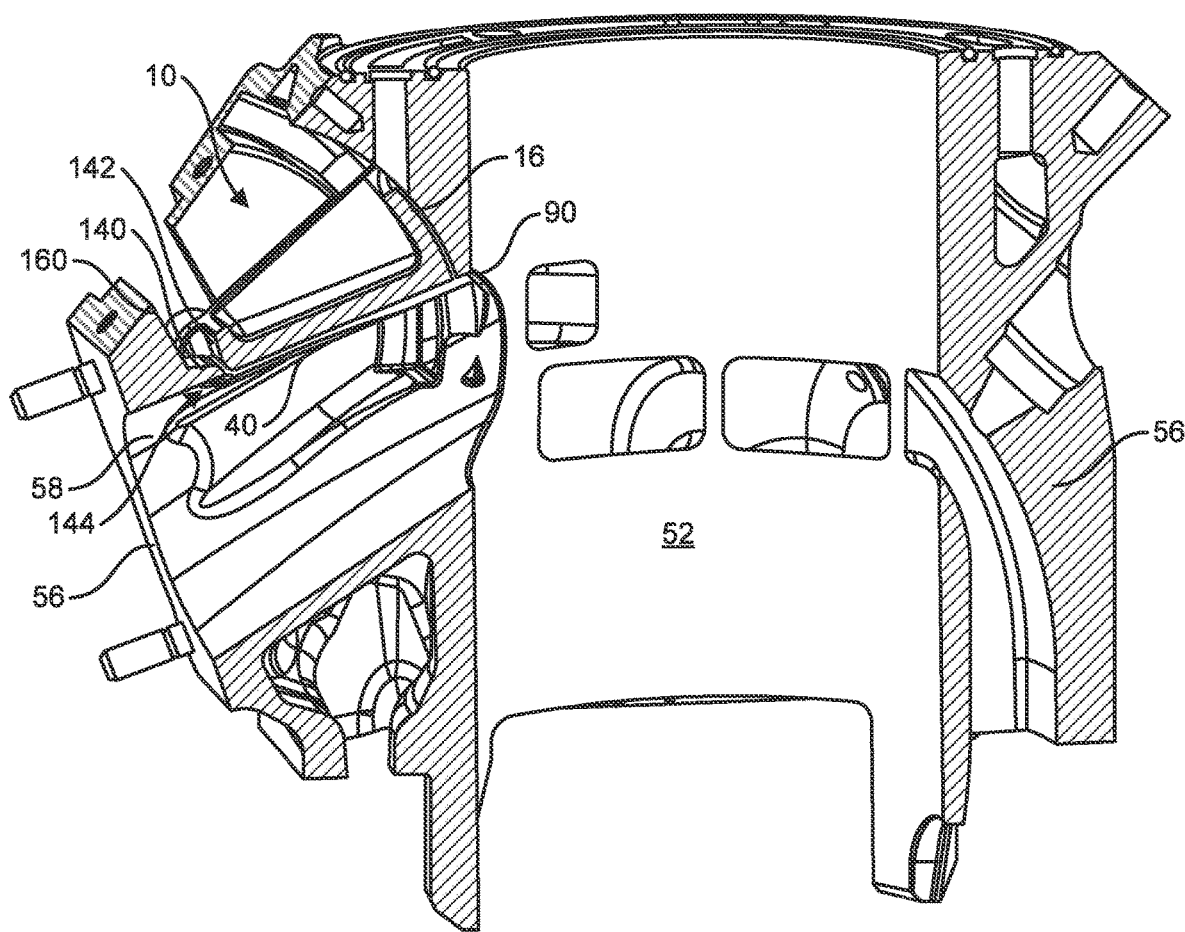
FIGS. 10A and 10B are cross-sectional views of a cylinder with the exhaust valve open accordance with an embodiment of the present disclosure.
Figure 10B:
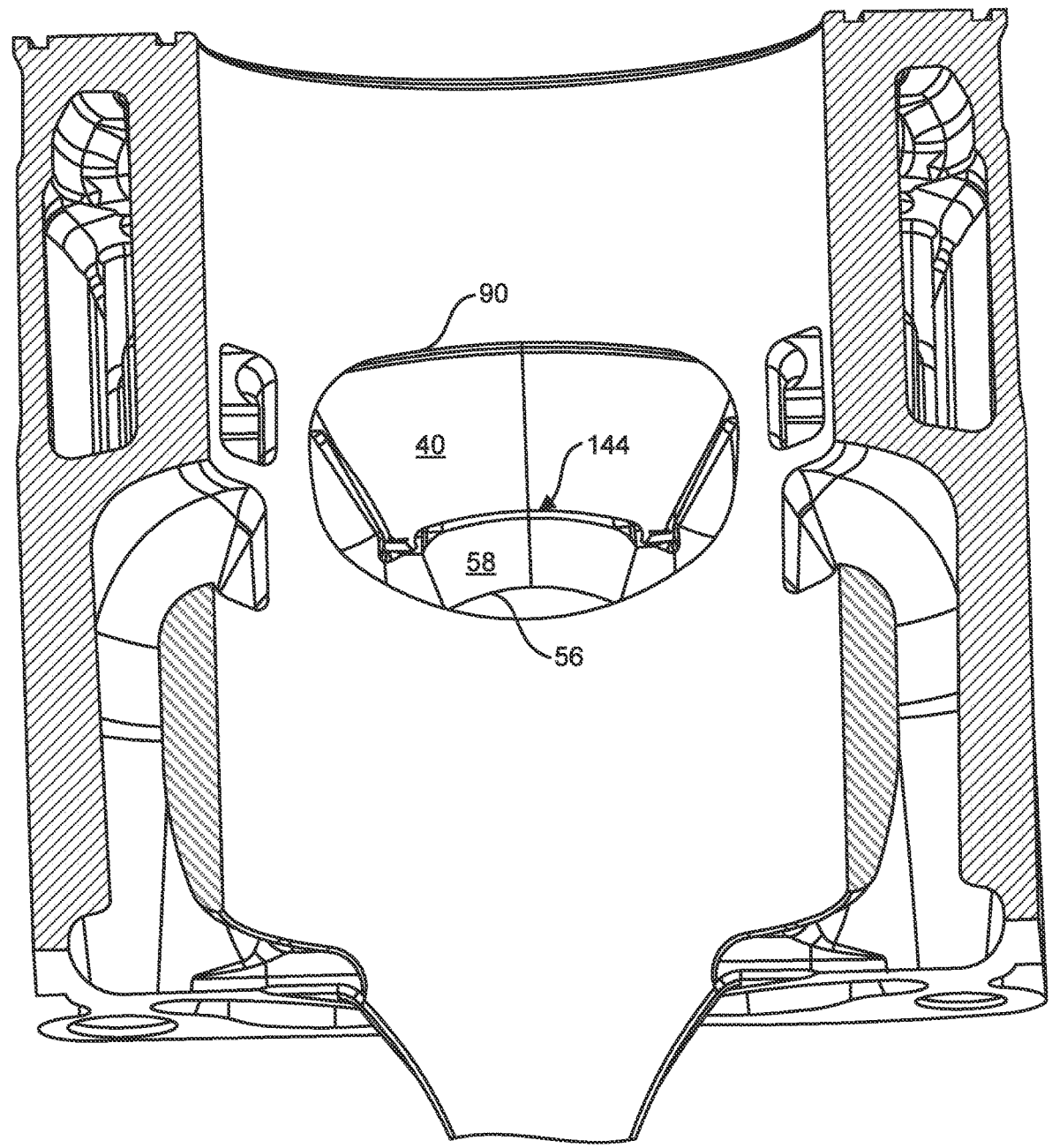

Referring to FIGS. 10A and 10B, in the raised configuration, the curved lower surface 40 may conform to the smooth shape defined by the surface 58 along a major portion of the extent of the lower surface 40 between the central valve surface 16 and the axis of rotation 14. For example, at least 90 percent of the length of the lower surface 40 between the recess 142 and the central valve surface 16 may lie within 3 mm of the smooth shape defined by the surface 58.

Figure 11:
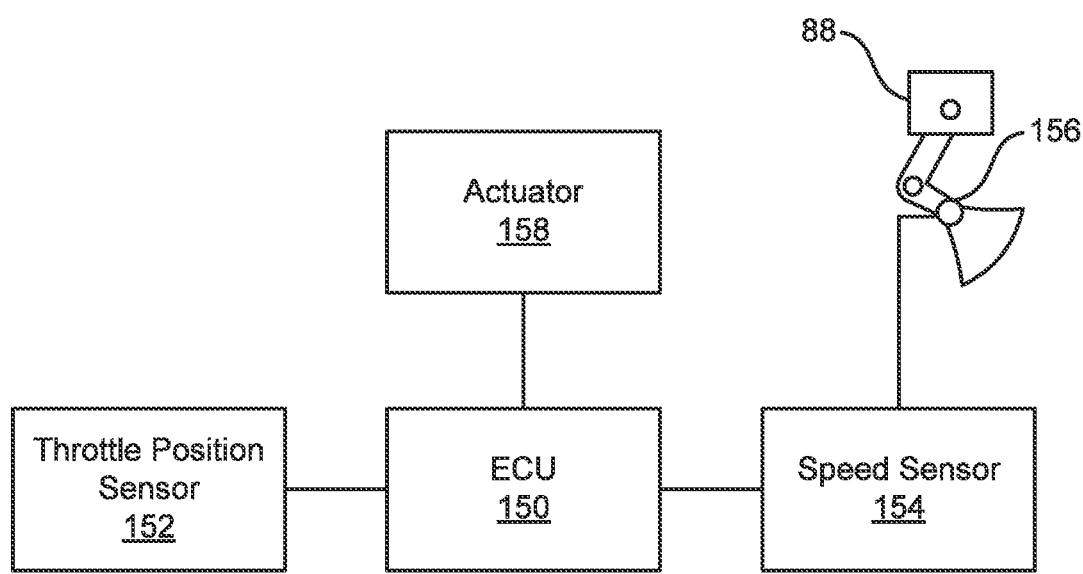
FIG. 11 is a schematic block diagram of components for controlling a two-stroke engine in accordance with an embodiment of the present disclosure.

Referring to FIG. 11, the two-stroke engine may be controlled by an engine control unit (ECU) 150 that is a circuit or computing device programmed to perform various control functions. The ECU 150 may be coupled to a throttle position sensor 152 configured to sense a position of a throttle controlling airflow into the crankcase of the two-stroke engine. The ECU may be coupled to a speed sensor 154 configured to sense a speed of rotation of a crankshaft 156 of the two-stroke engine. The crankshaft 156 is coupled to the piston 88 and is rotated thereby. The ECU 150 may be coupled to an actuator 158 coupled to the connector 100. As noted above, the actuator 158 may be an electric motor, solenoid, hydraulic piston, or pneumatic piston connected to the connector 100. In other embodiments, the actuator 158 drives the lever 30 directly rather than through a connector 100.

The ECU 150 may be programmed to control the driver in response to signals received from one or both of the throttle position sensor 152 and the speed sensor 154. As the angular speed of the crankshaft increases as indicated by the speed sensor 154, the ECU 150 causes the actuator 158 to raise the valve body 22 thereby increasing the effective size and height of the exhaust port 90 and opening the lateral exhaust ports 92. As the angular speed of the crankshaft decreases, the ECU 150 may cause the actuator 158 to lower the valve body 22 thereby decreasing the effective size and height of the exhaust port 90 and closing the lateral exhaust ports 92. The ECU 150 may cause the actuator 158 to position the valve body 22 at various positions between the raised configuration and the lowered configuration. The position of the valve body 22 for a given crankshaft speed may be retrieved from a mapping with which the ECU 150 is programmed or calculated by the ECU 150 according to a predefined function. The mapping or function may specify the position of the valve body 22 as a function of both crankshaft angular speed and throttle position.

In some embodiments, the benefits of the exhaust valve 10 may be achieved without the use of an ECU 150. For example, the crankshaft 156 may be connected to a mechanical governor by the connector 100 such that the governor pulls the exhaust valve 10 higher responsive to faster rotation of the crankshaft 156.

Other sensors may be coupled to the ECU 150 and the outputs thereof may also be used to select the position of the valve body 22. Such sensors may include an oxygen sensor positioned in contact with exhaust gasses, or a mass air flow (MAF) sensor positioned in contact with intake gasses. Any other sensor that is used to detect the state of an internal combustion engine may also be used.

The ECU 150 may cause rotation of the valve body 22 by the actuator 158 at an angular speed that is less than the angular speed of the crankshaft 156, such as less than half the angular speed. This is not to say that the ECU 150 does not adjust the position of the valve body 22 upon each revolution of the crankshaft 156. However, even where adjustment is performed every revolution, the angular rotation speed of the valve body 22 may remain lower than the angular rotation speed of the crankshaft 156.

The range of motion of the valve body 22 may be limited. For example, the valve body 22 may be limited to a range of rotation less than 90 degrees, less than 45 degrees, less than 30 degrees, or less than 20 degrees.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An exhaust valve comprising:
    a valve body defining an axis of rotation;

a central valve surface positioned on the valve body and conforming to a first curved shape; and a first lateral valve surface positioned on the valve body, the first lateral valve surface conforming to a second curved shape that is different from the first shape.

2. The exhaust valve of claim 1, wherein the first curved shape and the second shape are symmetric about the axis of rotation.

3. The exhaust valve of claim 1, further comprising a second lateral valve surface defined by the valve body, the central valve surface being positioned between the first lateral valve surface and the second lateral valve surface, the second lateral valve surface conforming to a third shape that is different from the first shape.

4. The exhaust valve of claim 3, wherein the first curved shape is part of a circular toroidal shape and the second curved shape and the third curved shape are each part of a cylindrical shape.

5. The exhaust valve of claim 3, wherein the first and second lateral valve surfaces are positioned closer to the axis of rotation than a major portion of the central valve surface.

6. The exhaust valve of claim 3, wherein the first and second lateral valve surfaces are formed on fins extending outwardly from a central axis of the valve body, the central axis extending through the central valve surface.

7. The exhaust valve of claim 1, further comprising rods extending outwardly from the valve body, the rods defining the axis of rotation.

8. The exhaust valve of claim 1, wherein the valve body has a concave lower surface extending between the central valve surface and the axis of rotation.

9. The exhaust valve of claim 8, wherein the valve body defines a recess on an upper surface thereof, the upper surface being opposite the concave lower surface and positioned between the central valve surface and the axis of rotation.

10. The exhaust valve of claim 1, wherein the central valve surface is configured to at least partially block fluid communication through a first exhaust port defined by a cylinder wall of an engine to an environment external to the engine, and the first lateral valve surface is configured to at least partially block fluid communication through a second exhaust port defined by the cylinder wall of the engine to the environment.

11. The exhaust valve of claim 10, wherein the second exhaust port is separate and distinct from the first exhaust port.

12. The exhaust valve of claim 10, wherein the central valve surface is configured to at least partially allow fluid communication through the first exhaust port to the environment while the first lateral valve surface is configured to block fluid communication through the second exhaust port to the environment.

13. The exhaust valve of claim 10, wherein the first lateral valve surface is positioned closer to the axis of rotation than a major portion of the central valve surface.

14. The exhaust valve of claim 10, wherein the first lateral valve surface is positioned closer to the axis of rotation than a majority of the central valve surface.

15. The exhaust valve of claim 1, wherein the first lateral valve surface is in a fixed position relative to the central valve surface.

16. An engine comprising:

the exhaust valve of claim 1;

a cylinder wall defining a first exhaust port and a second exhaust port, wherein the central valve surface is configured to at least partially block fluid communication through the first exhaust port to an environment external to the engine, and the first lateral valve surface is configured to at least partially block fluid communication through the second exhaust port to the environment.

17. The engine of claim 16, further comprising an electronic control unit, wherein the central valve surface is configured to transition back and forth between a high-flow position and a low-flow position, the central valve surface covering a greater amount of the first exhaust port in the low-flow position than in the high-flow position, the electronic control unit being programmed to cause the valve body to move toward the low-flow position based on a decrease in the angular speed of a crankshaft.

18. The engine of claim 17, wherein the electronic control unit is programmed to cause the valve body to move toward the high-flow position based on an increase in the angular speed of the crankshaft.

19. The engine of claim 17, wherein the central valve surface does not completely cover the first exhaust port when in the low-flow position.

20. The engine of claim 16, wherein the second exhaust port is separate and distinct from the first exhaust port.

21. The engine of claim 16, wherein the central valve surface is configured to at least partially allow fluid communication through the first exhaust port to the environment while the first lateral valve surface is configured to block fluid communication through the second exhaust port to the environment.

22. The engine of claim 21, wherein the first lateral valve surface is positioned closer to the axis of rotation than a major portion of the central valve surface.

23. The engine of claim 21, wherein the first lateral valve surface is positioned closer to the axis of rotation than a majority of the central valve surface.

24. The engine of claim 16, wherein the first lateral valve surface is formed on a fin extending outwardly from a central axis of the valve body, the central axis extending through the central valve surface.

25. The engine of claim 16, wherein the exhaust valve is received in a cavity outside of the cylinder, the valve body having a concave lower surface that, when the valve body is in a high-flow position, conforms to a smooth path that at least partially defines the cavity.

* * * * *